(12) United States Patent
Shoji et al.

(10) Patent No.: US 7,663,118 B2
(45) Date of Patent: Feb. 16, 2010

(54) SCINTILLATOR PANEL (75) Inventors: Takehiko Shoji, Hachioji (JP); Yasushi Nagata, Kodaira (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/819,107

(22) Filed: Jun. 25, 2007

(65) Prior Publication Data

US 2008/0011961 A1 Jan. 17, 2008

(30) Foreign Application Priority Data

Jun. 28, 2006 (JP) ............... 2006-177823

(51) Int. Cl.
G01T 1/20 (2006.01)
(52) U.S. Cl. ............... 250/370.11
(58) Field of Classification Search ............... 250/483.1, 250/484.4, 580, 370.11, 361 R, 367
See application file for complete search history.

(56) References Cited

U.S. PATENT DOCUMENTS

| 6,469,305 | B2 * | 10/2002 | Takabayashi et al. | 250/361 R |
| 6,652,994 | B2 * | 11/2003 | Yanagita et al. | 428/690 |
| 2005/0040340 | A1 * | 2/2005 | Morikawa et al. | 250/484.4 |
| 2005/0274916 | A1 * | 12/2005 | Shoji et al. | 250/580 |
| 2006/0208208 | A1 * | 9/2006 | Isoda et al. | 250/580 |

FOREIGN PATENT DOCUMENTS

| JP | 54-35060 | | 10/1979 |
| JP | 01044900 | A * | 2/1989 |
| JP | 6095302 | | 4/1994 |
| JP | 2000-284053 | | 10/2000 |
| JP | 2001-59899 | | 3/2001 |
| JP | 2004264231 | A * | 9/2004 |
| JP | 2005-308582 | | 11/2005 |

OTHER PUBLICATIONS

Antonuk et al., "Development of a High Resolution Active Matrix Flat-Panel Imager with Enhanced Fill Factor," SPIE, vol. 3032, pp. 2-13. 1997.
Rowlands et al. "Amorphous Semiconductors Usher in Digital X-ray Imaging," Physics Today, Nov. 1997, pp. 24- 30. Nov. 24, 2007.
English Language Derwent Abstract for JP 2005-308582. Nov. 2, 2005.

(Continued)

Primary Examiner—David P Porta
Assistant Examiner—Faye Boosalis
(74) Attorney, Agent, or Firm—Finnegan, Henderson, Farabow, Garrett & Dunner, L.L.P.

(57) ABSTRACT

A scintillator panel comprising: (a) a scintillator sheet comprising: (i) a substrate, and (ii) a phosphor layer formed on the substrate; (b) a first protective film provided on a phosphor layer side surface of the scintillator sheet; and (c) a second protective film provided on a substrate side surface of the scintillator sheet, wherein (d) the scintillator sheet is sealed by the first protective film and the second protective film; and (e) the first protective film is not substantially coherent with the phosphor layer.

8 Claims, 3 Drawing Sheets

OTHER PUBLICATIONS

English Language Derwent Abstract for JP 2000-284053 Oct. 13, 2000.
English Language Derwent Abstract for JP 6-95302. Apr. 8, 1994.
English Language Derwent Abstract for JP 54-35060. Oct. 31, 1979.
English Language Derwent Abstract for JP 2001-59899 Mar. 6, 2001.

Thin Film Handbook, pp. 879-902 (the Japan Society for the Promotion of Science).
Vacuum Technology Handbook pp. 498-811 (Nikkan Kogyo Shimbun Ltd.).
Packaging Technology, vol. 29, No. 8., pp. 47-48.

* cited by examiner

SCINTILLATOR PANEL

This application is based on Japanese Patent Application No. 2006-177823 filed on Jun. 28, 2006 in Japanese Patent Office, the entire content of which is hereby incorporated by reference.

FIELD OF THE INVENTION

The present invention relates to a scintillator panel used to form a radiographic image of a subject.

BACKGROUND

The radiographic image such as an X-ray image has been used over an extensive range in the field of medical treatment for the diagnosis of the state or progress of a disease. Specifically, the radiographic image based on an intensifying screen-film combination has been improved to enhance sensitivity and image quality in its long history. As a result, it is still employed in the field of medical treatment all over the world as an image pickup system characterized by both a high degree of reliability and excellent cost/performance ratio. However, such image information pertains to so-called analog image information, which is not suited for free image processing or instantaneous transmission, unlike the digital image information that has been making a rapid progress in recent years.

In recent years, a radiographic image detecting apparatus of digital system represented by the Computed Radiography (CR) or flat panel detector (FPD) is coming on the market. The apparatus of this type directly provides a digital radiographic image, and directly shows an image on an image display apparatus such as a cathode ray tube or liquid crystal panel. It does not always require formation of an image on a photographic film. Thus, the X-ray image detecting apparatus of the digital system reduces the need of forming an image by silver halide photography, and hence provides a substantial improvement in the convenience of diagnostic operation in a hospital or clinic.

The Computed Radiography (CR) as one of the X-ray image digital techniques is currently being accepted in the field of medical treatment. However, it is insufficient in sharpness of the image and spatial resolution, and has not yet reached the image quality level of the screen/film system. A flat panel X-ray detector (FPD) using a thin film transistor (TFT) has been developed as a newer digital X-ray image technique, as disclosed, for example, in an "Amorphous Semiconductor Usher in Digital X-ray Imaging" by John Rowlands, "Physics Today", November 1997, P. 24, or "Development of a High Resolution Active Matrix, Flat-Panel Imager with Enhanced Fill Factor" by L. E. Antonuque, SPIE, P. 2. Vol. 32.

A scintillator plate containing an X-ray phosphor which emits light when irradiated with X-rays is used to convert radiation into visible light. To improve the SN ratio in low-dose photographing, it is necessary to use a scintillator plate of high light emitting efficiency. Generally, the emitting efficiency of a scintillator plate is determined by the thickness of a phosphor layer and the X-ray absorbency coefficient of the phosphor. However, increase in the thickness of the phosphor layer results in scattering of the light emitted in the phosphor layer, whereby the sharpness of the image is reduced. Accordingly, the film thickness is determined when the sharpness required for image quality is determined.

Cesium iodide (CsI) is characterized by a relatively high conversion ratio of X-rays to the visible light, and is capable of easily forming a phosphor in a columnar crystal structure by evaporation. Thus, the scattering of the light emitted in the columnar crystal is reduced due to the light guiding effect, and the thickness of the phosphor layer can be increased. However, if only CsI is used, the light emitting efficiency is lower. As shown in Patent Document 1, CsI blended with sodium iodide (NaI) in a desired mole ratio is deposited on the substrate as sodium activated cesium iodide (CsI:Na) by vapor deposition. In recent years, CsI blended with thallium iodide (TlI) at a desired mole ratio is deposited on the substrate as thallium activated cerium iodide (CsI:Tl). This is annealed in the post-process to improve the visible light conversion efficiency and the resulting product is used as an X-ray phosphor.

However, the CsI-based scintillator (phosphor layer) is hygroscopic and has a problem of being deteriorated with the lapse of time. To avoid such deterioration with the lapse of time, methods are proposed to form a moisture proof protective layer on the surface of the CsI-based scintillator (phosphor layer). For example, in one of such methods, the top and side of the scintillator layer (corresponding to the phosphor layer of the present invention) and the outer peripheral portion of the scintillator layer of the substrate is covered with a polyparaxylylene resin (e.g., Patent Document 2). However, the polyparaxylylene resin disclosed in the Patent Document 2 is less moisture-proof and is incapable of providing a sufficient protection of the phosphor layer. Further, the polyparaxylylene resin enters the gap of the columnar crystal constituting the scintillator layer, whereby the light guiding effect is hindered.

There is a method known in the conventional art wherein a transparent resin film having a moisture permeation of less than $1.2 \text{ g/m}^2/\text{day}$ is used to cover at least the side opposite the supporting member of the scintillator layer as well as the lateral side thereof (e.g., Patent Document 3). However, according to the method described in Patent Document 3, when a transparent organic polymer film such as polypropylene or polyethylene terephthalate is placed as a protective layer in a state of being coherent (or in close contact) with the top of the phosphor layer, a high moisture proof property can be obtained, but the sharpness of the image is reduced, which is a serious defect. To avoid this, the film thickness must be kept at 5 µm or less, which is insufficient to protect the phosphor layer against chemical degeneration or physical impact. Thus, this material is not fully suitable as a protective layer.

For the reasons mentioned above, there has been a demand for development of a scintillator panel sealed by a protective film capable of avoiding deterioration of the phosphor layer with the lapse of time, and protecting the phosphor layer from chemical deterioration and physical impact, while preventing deterioration in the sharpness of the image.

Patent Document 1: Examined Japanese Patent Publication No. 54-35060

Patent Document 2: Unexamined Japanese Patent Application Publication (hereinafter referred to as JP-A) No. 2000-284053

Patent Document 3: JP-A No. 2005-308582

SUMMARY OF THE INVENTION

An object of the present invention is to provide a scintillator panel sealed by a protective film capable of avoiding deterioration of the phosphor layer with the lapse of time, and protecting the phosphor layer from chemical deterioration and physical impact, while preventing deterioration in the sharpness of the image.

One of the aspects of the present invention to achieve the above object is a scintillator panel comprising: (a) a scintillator sheet comprising: (i) a substrate and (ii) a phosphor layer formed on the substrate; (b) a first protective film provided on a surface of the scintillator sheet where the phosphor layer is formed; and (c) a second protective film provided on the other surface of the scintillator sheet, wherein (d) the scintillator sheet is sealed by the first protective film and the second protective film; and (e) the first protective film is not substantially coherent with the phosphor layer.

DESCRIPTION OF THE PREFERRED EMBODIMENT

The above object of the present invention is achieved by the following structures:

(1) A scintillator panel comprising:
(a) a scintillator sheet comprising:
(i) a substrate, and
(ii) a phosphor layer formed on the substrate;
(b) a first protective film provided on a phosphor layer side surface of the scintillator sheet; and
(c) a second protective film provided on a substrate side surface of the scintillator sheet, wherein
(d) the scintillator sheet is sealed by the first protective film and the second protective film; and
(e) the first protective film is not substantially coherent with the phosphor layer.

(2) The scintillator panel of Item (1), wherein a surface roughness Ra of a surface of the phosphor layer is 0.1 μm to 5.0 μm.

(3) The scintillator panel of Item (1) or (2), wherein a surface roughness Ra of a surface of the first protective film facing the phosphor layer is 0.1 μm to 5.0 μm.

(4) The scintillator panel any one of Items (1) to (3), wherein transparent particles having diameters of 0.5 μm to 10 μm are provided on the phosphor layer before sealing the scintillator sheet by the first protective film and the second protective film.

(5) The scintillator panel of any one of Items (1) to (4), wherein the scintillator sheet is sealed under a pressure of 5 Pa to 8000 Pa.

(6) The scintillator panel of any one of Items (1) to (5), wherein each of the first protective film and the second protective film has a thickness of 12 μm to 60 μm and a haze ratio of 3% to 40%.

(7) The scintillator panel of any one of Items (1) to (6), wherein each of the first protective film and the second protective film has a moisture permeability of 0.01 g/m²/day to 50 g/m²/day under a condition of 40° C. and 90% RH.

(8) The scintillator panel of any one of Items (1) to (7), wherein the phosphor layer is formed by a vapor deposition method on the substrate.

(9) The scintillator panel of any one of Items (1) to (8), wherein the phosphor layer comprises cesium iodide (CsI).

In the present invention, it was deduced that: When a transparent polymer film such as a polypropylene and polyethylene terephthalate film is placed on a phosphor layer as a protective film being coherent (or in close contact) with the phosphor layer, a high moisture proof property can be obtained, but the level of sharpness of the image is reduced. This is because, when the light emitted from the phosphor layer passes through the protective film, the light entering the protective film having an angle exceeding the critical angle θ (θ being an angle against the normal line of the scintillator sheet) is fully reflected at the protective film—outside air interface, and the reflected light propagates a long distance, with the result that the level of sharpness of the image is reduced. In the present invention, it was assume that, as the protective film becomes thicker, the reflected light goes farther, and therefore, the level of sharpness of the image is reduced.

By contract, to prevent the overall reflection at the protective film—outside air interface, arrangement is made in such a way that the critical angle θ does not exist when the light emitted from the phosphor layer enters the protective film. Then the light is discharged to the outside, without being totally reflected at the protective film—air interface. This finding has led to the present invention.

The present invention provides a scintillator panel sealed by the protective film capable of preventing deterioration of properties of the phosphor layer with time and protecting the phosphor layer from chemical deterioration or physical impact, with the result that deterioration in the level of sharpness of the image is minimized. This arrangement enhances the reliability of the scintillator panel and ensures the use with relief.

Referring to FIGS. 1(a) through FIG. 4, the following describes the embodiments of the present invention, however, the present invention is not limited thereto.

Figure 1A:
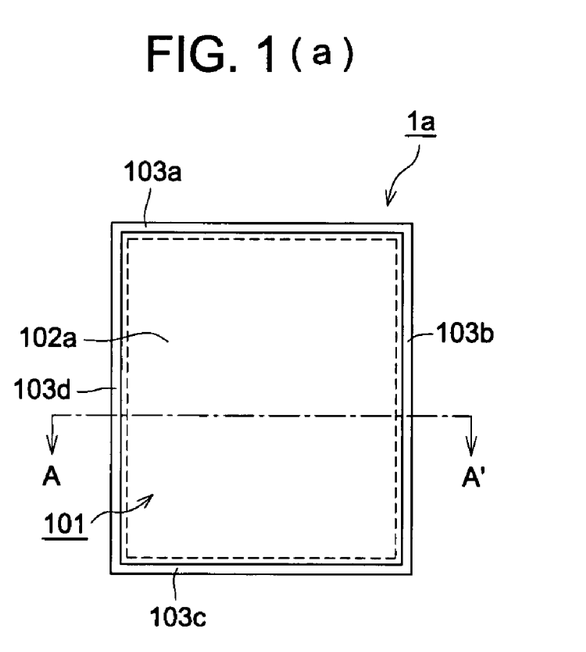
FIGS. 1(a) to 1(c) are schematic plan views each showing a scintillator panel.
Figure 1B:
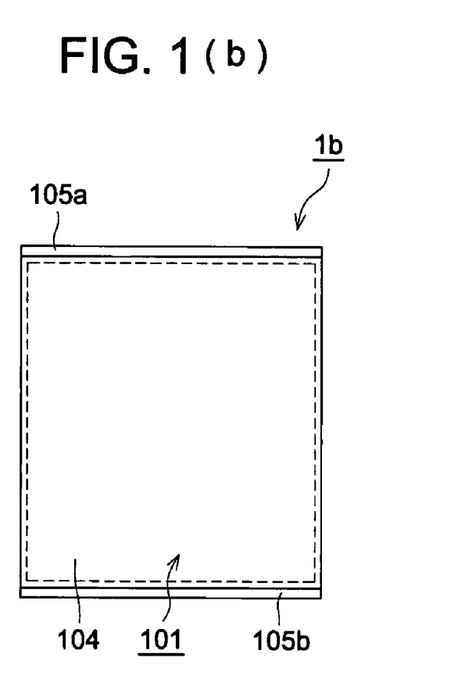
Figure 1C:
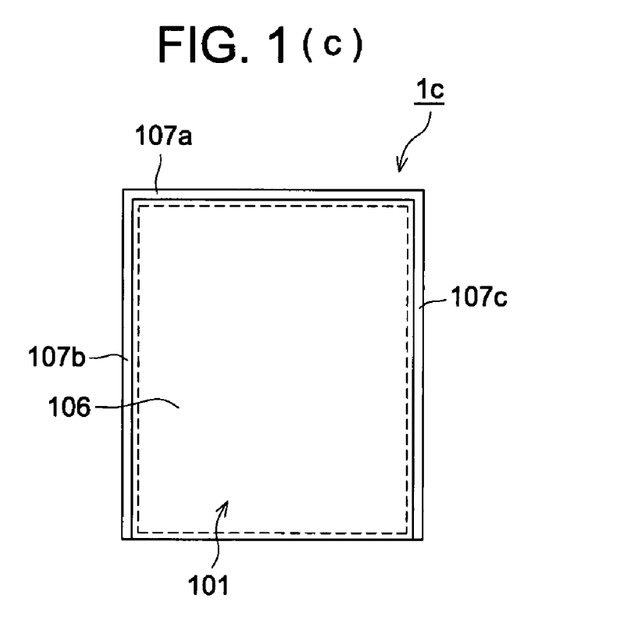

FIGS. 1(a) to 1(c) are schematic plan views each showing a scintillator panel. FIG. 1(a) is a schematic plan view representing the scintillator panel wherein the scintillator sheet is sealed by a protective film using a four-side seal. FIG. 1(b) is a schematic plan view representing the scintillator panel wherein the scintillator sheet is sealed by a protective film using a two-side seal. FIG. 1(c) is a schematic plan view representing the scintillator panel wherein the scintillator sheet is sealed by a protective film using a three-side seal.

The following describes the scintillator panel of FIG. 1(a). In this drawing, reference numeral 1a shows the scintillator panel. The scintillator panel 1a contains a scintillator sheet 101, a first protective film 102a arranged on the side of the phosphor layer 101b (FIG. 2(a)) of the scintillator sheet 101, and a second protective film 102b (FIG. 2(a)) arranged on the side of the substrate 101a (FIG. 2(a)) of the scintillator sheet 101. Reference numerals 103a through 103d denote four sealing portions of the protective film 102a and second protective film 102b (FIG. 2(a)). The sealing portions 103a through 103d are all formed on the outside of the edge portion of the scintillator sheet 101. As illustrated, the four-side seal is defined as having sealing portions in four sides. The illustrated four-side seal of this drawing can be formed by sandwiching the scintillator sheet between two sheet-like protective films, namely, the first protective film 102a and second protective film 102b (FIG. 2(a)), and sealing in four sides. In this case, the first protective film 102a and second protective film 102b (FIG. 2(a)) may be either different or the same. Either arrangement can be selected as required.

The following describes the scintillator panel of FIG. 1(b). In the drawing, the reference numeral 1b indicates a scintillator panel. The scintillator panel 1b includes a scintillator sheet 101, a first protective film 104 arranged on the side of the phosphor layer 101b (FIG. 2(a)) of the scintillator sheet 101 and a second protective film (not illustrated) arranged on the side of the substrate 101a (FIG. 2(a)) of the scintillator sheet 101. The reference numerals 105a and 105b indicate two sealing portions, namely, the protective film 104 and the second protective film (not illustrated) arranged on the side of the substrate. The sealing portions 105a and 105b are all formed outside the edge portion of the scintillator sheet 101. As illustrated, the two-side sealing can be defined as the state of being sealed in two sides. The two-side sealing shown in this drawing can be produced by sandwiching the scintillator sheet between the protective films formed in a cylindrical shape by inflation and sealing on two sides. In this case, the protective film used as the first protective film 104 and second protective film (not illustrated) are the same.

The following describes the scintillator panel of FIG. 1(c). In this drawing, the reference numeral 1c indicates a scintillator panel. The scintillator panel 1c has a scintillator sheet 101, a first protective film 106 arranged on the side of the phosphor layer 101b (FIG. 2(a)) of the scintillator sheet 101, and a second protective film (not illustrated) arranged on the side of the substrate 101a (FIG. 2(a)) of the scintillator sheet 101. Numerals 107a through 107c denote three sealing portions of a first protective film 106 and second protective film (not illustrated) arranged on the side of the substrate. The sealing portions 107a through 107c are formed outside the edge portion of the scintillator sheet 101. The three-side sealing can be defined as the state of being sealed in three sides, as shown in this drawing. The three-side seal shown in this drawing can be manufactured by folding one protective film at the center, sandwiching the scintillator sheet between two protective film having been formed, and sealing in three sides. In this case, the protective films used as the first protective film 106 and the second protective film (not illustrated) are the same. As shown in FIG. 1(a) through FIG. 1 (c), the sealing portions between two protective films—the first protective film and second protective film—are located outside the edge portion of the scintillator sheet. This arrangement prevents entry of water from the outer periphery. The phosphor layer of the scintillator sheet shown in FIG. 1(a) through FIG. 1 (c) is preferably formed on the substrate according to the vapor deposition method to be described later. A vapor deposition method, vapor deposition method, sputtering method, CVD method or ion plating method can be used.

The form of the scintillator panel shown in FIG. 1(a) through FIG. 1(c) can be selected according to the type of the phosphor layer of the scintillator sheet and the type of the manufacturing apparatus.

Figure 2A:
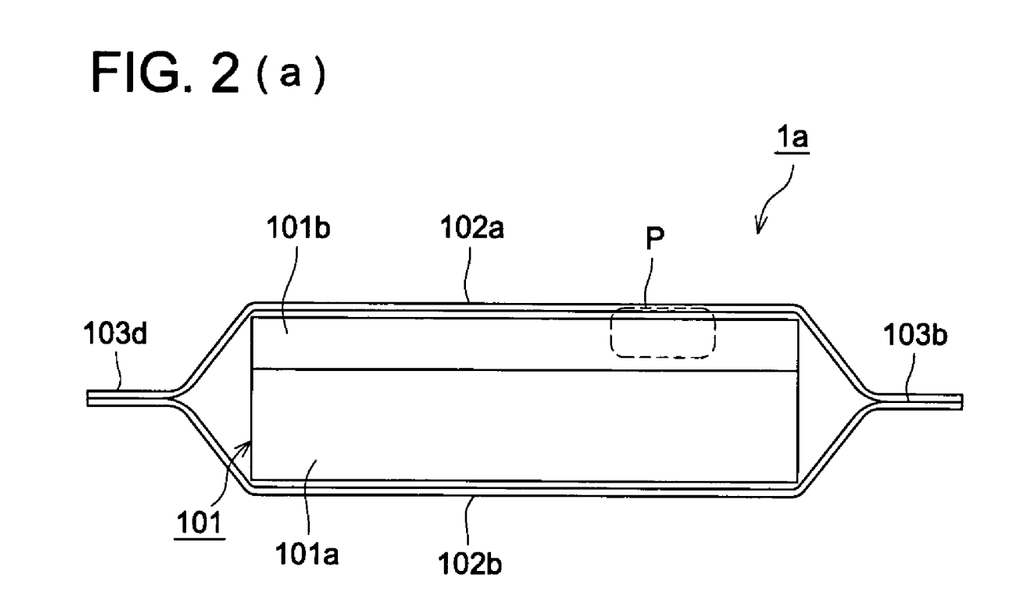
FIG. 2(a) is a schematic cross sectional view taken along A-A' in FIG. 1(a).
Figure 2B:
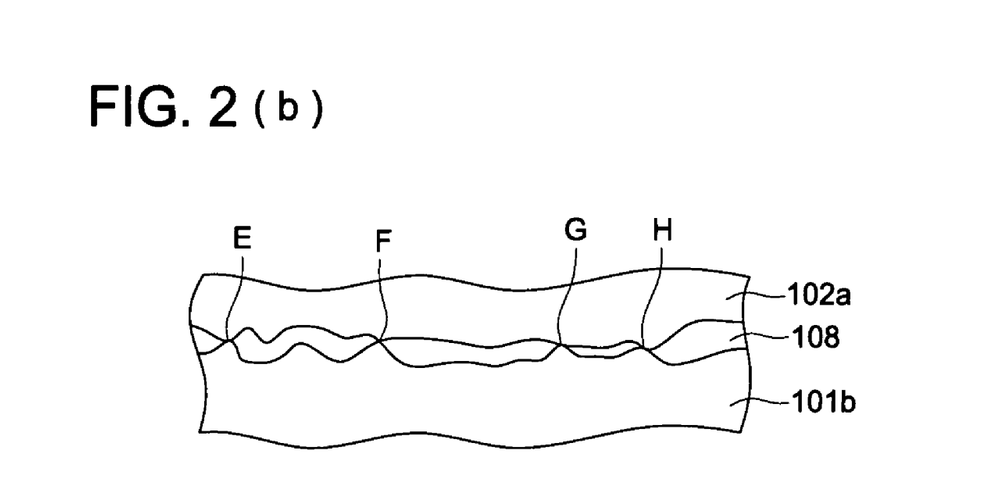
FIG. 2(b) is an enlarged cross sectional view of the portion represented by P in FIG. 2(a).

FIG. 2(a) is a schematic cross sectional view taken along A-A' in FIG. 1(a). FIG. 2(b) is an enlarged schematic cross sectional view showing the portion indicated by P of FIG. 2(a).

The scintillator sheet 101 includes a substrate 101a and a phosphor layer 101b formed on the substrate 101a. The reference numeral 102b denotes a second protective film arranged on the side of the substrate 101a of the scintillator sheet 101. The reference numeral 108 indicates a gap portion (air layer) formed between the point contact portions E through H kept partially in contact between the first protective film 102a and second phosphor layer 101b. The gap portion (air layer) 108 forms an air layer. The relationship between the refractive index of the gap portion (air layer) 108 and that of the first protective film 102a is represented as: the refractive index of protective film 102a >>refractive index of the gap portion (air layer) 108. In the case of the scintillator panel shown in FIG. 1(b) and FIG. 1(c), the relationship between the refractive index of the gap portion (air layer) 108 and that of the first protective film 102a is the same as that of this drawing.

To be more specific, the first protective film 102a arranged on the side of the phosphor layer 101b is not fully coherent with the phosphor layer 101b. It is partially in contact at point contact portions E through H. When the entire surface on the side of the phosphor layer 101b is covered with the first protective film 102a arranged on the side of the phosphor layer 101b, the number of these point contact portions E through H are preferably 0.1 per mm$^2$ or more without exceeding 25 per mm$^2$ with respect to the surfaced area of the phosphor layer 101b. In the present invention, such a state is referred to as the expression that the first protective film provided on the phosphor layer side surface of the scintillator sheet is not substantially coherent with the phosphor layer. For the scintillator panel shown in FIGS. 1(b) and 1(c), the relationship of the number of the point contact portions relative to the surface area of the phosphor layer is the same as that shown in this drawing.

When the number of the point contact portions exceeds 25 per mm$^2$, there is an increase in the percentage where the light with the incident angle exceeding the critical angle θ is totally reflected at the protective layer—outside air interface. This is one of the reasons for reduction in the level of sharpness of the image. When the number of the point contact portions is less than 0.1 per mm$^2$, it becomes difficult to stably form the gap portion (air layer) 108 between the first protective film 102a and the phosphor layer The number of the point contact portions is measured according to the following method:

X-rays are applied to the scintillator panel and the emitted light is read out by the flat light receiving element using a CMOS or CCD, whereby the data of signal are obtained. The power spectrum data for each spatial frequency is obtained by Fourier transformation of the data. The number of point contact portions can be identified from the position of the peak of this power spectrum. To be more specific, at the points in contact with the protective layer, from the aforementioned reasons, there is an increase in the percentage of the emitted light being fully reflected at the protective layer—outside air interface, resulting in occurrence of periodic low luminance portions inside the plane. The number of the contact points can be obtained by measuring this periodicity.

As shown in this drawing, the scintillator panel 1a is covered by the first protective film 102a arranged on the surface of the phosphor layer 101b side of the scintillator sheet 101 and the second protective film 102b on the surface of the substrate 101a side, while the entire surfaces of the substrate 101a and phosphor layer 101b are not substantially coherent with the first protective film 102a, and each of the ends on four sides of the first protective film 102a and second protective film 102b is sealed.

The following methods can be used to cover the scintillator panel 1a while the entire surface of the phosphor layer 101b is not substantially coherent with the first protective film 102a:

1) The surface roughness Ra of the phosphor layer is preferably 0.1 μm through 5.0 μm, in view of the degree of coherence with the first protective film, the level of sharpness of the image and the degree of coherence with the flat light receiving element. The surface roughness Ra can be kept at 0.1 μm through 5.0 μm by adjusting the roughness of the substrate to be used, when a phosphor layer is formed on the substrate according to the chemical vapor deposition method, or by adjusting the temperature of the substrate and degree of vacuum at the time of vapor deposition. The surface roughness Ra indicates the value measured by the Surfcom 1400D by Tokyo Seimitsu Co., Ltd.

2) The surface roughness Ra of the surface of the first protective film facing the phosphor layer is preferably 0.05 μm through 0.8 μm, in view of the degree of coherence with the phosphor layer, the level of sharpness of the image and the degree of coherence with the flat light receiving element. The surface condition of the first protective film can be easily adjusted by selecting the resin film to be used or by coating the resin film with a coating composition containing such as an inorganic substance. The surface roughness Ra indicates the value measured by the Surfcom 1400D by Tokyo Seimitsu Co., Ltd.

3) Before the scintillator sheet is sealed with the first protective film and second protective film, the transparent particles can be arranged on the phosphor layer. The particle diameters are preferably 0.5 μm through 10 μm in view of the degree of coherence with the first protective film, the sharpness of the image and the degree of coherence with the flat light receiving element. The particle diameter is the value obtained by measuring the particles with an image processing analyzer "LUZEX AP" (by Nireco) wherein transparent particles were photographed at a magnification of 30,000 times by a scanning electron microscope, and the photographic image was captured by a scanner. Examples of the transparent particles to be used include: inorganic particles such as glass beads and resin particles such as PMMA, although the particles are not limited thereto.

4) The scintillator sheet is preferably sealed by the first protective film and second protective film under a reduced pressure of 5 Pa through 8000 Pa. In this case, when it is sealed under a higher degree of vacuum, there is an increase in the number of point contact portions between the protective film and phosphor layer. Conversely, when it is sealed under a lower degree of vacuum, the number of point contact portions is reduced. When the pressure is 8000 Pa or more, wrinkles are likely to occur on the surface of the protective film. This is not practical. It can be covered by one of the aforementioned methods 1) through 4) or by the combination thereof, while the entire surface of the phosphor layer $101b$ is not substantially coherent with the first protective film $102a$.

The thickness of the protective film is preferably 12 μm or more without exceeding 60 μm, more preferably 20 μm or more without exceeding 40 μm, with consideration given to the formidability of gap portion, the protectively of phosphor layer, the level of sharpness of the image, moisture proof property and workability. To get the thickness, ten positions were measured by the probe type film thickness gauge (PG-01) manufactured by Techloc Inc., and the average value of the measurements is used to denote the thickness. Further, the haze ratio is preferably 3% or more without exceeding 40%, more preferably 3% or more without exceeding 10%, with consideration given to the level of sharpness of the image, irregularity of radiographic image and manufacturing stability and workability. The haze ratio is the value obtained by measurement using the NDH 5000W manufactured by Nippon Denshoku Co., Ltd. The required haze ratio can be selected from among commercially available resin films, and can be easily made available.

The light transmittance of the protective film is preferably 70% or more at 550 nm, with consideration given to the photoelectric conversion efficiency and scintillator light wavelength. The film having a light transmittance of 99% or more is industrially difficult to procure. Thus, the light transmittance is preferably 99% through 70%. The light transmittance is the value obtained from measurement by spectrophotometer (U-1800) manufactured by Hitachi High Technologies Inc.

The moisture permeability of the protective film is preferably 50 g/m$^2$/day (40° C.-90% RH) (as measured according to JIS Z0208) or less, more preferably 10 g/m$^2$/day (40° C.-90% RH) (according to JIS Z0208) or less, with consideration given to the protection and hygroscopic property of the phosphor layer. Since the film having a moisture permeability of 0.01 g/m$^2$/day (40° C.-90% RH) or less is industrially difficult to obtain, the moisture permeability is preferably 0.01 g/m$^2$/day (40° C.-90% RH) to 50 g/m$^2$/day (40° C.-90% RH) (according to JIS Z0208), more preferably 0.1 g/m$^2$/day (40° C.-90% RH) to 10 g/m$^2$/day (40° C.-90% RH) (according to JIS Z0208).

As illustrated, the scintillator sheet $101$ can be sealed by the first protective film $102a$ and the second protective film $102b$ by any known method. For example, to ensure effective sealing by hot melting method using an impulse sealer, the innermost layer wherein the protective film $102a$ and protective film $102b$ are kept in contact is preferably used as a resin film having a heat-seal capacity.

Figure 3:
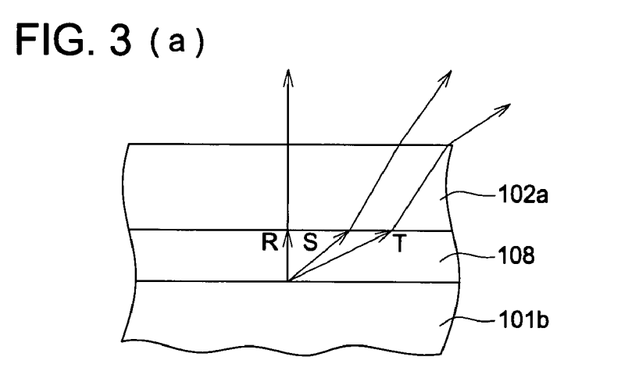
FIG. 3(a) is a schematic diagram showing how the light is refracted at the gap portion shown in FIG. 2(b).
FIG. 3(b) is a schematic diagram showing how the light is refracted in the conventional scintillator panel where the phosphor layer and the protective film are coherent with each other.

FIG. 3 is a schematic diagram showing that light is refracted on the gap portion shown in FIG. 2, and the light is refracted when the conventional protective film and phosphor layer are kept coherent. FIG. 3($a$) is a schematic diagram showing that light is refracted on the gap portion of FIG. 2. FIG. 3($b$) is a schematic diagram showing that light is refracted when the conventional protective film and phosphor layer are kept coherent.

The following describes the case of FIG. 3($a$):

In the case shown in this drawing, to ensure that the gap portion (air layer) $108$ is present between the protective film and phosphor layer, the relationship between refractive index of the first protective film $102a$ and refractive index of the gap portion (air layer) $108$ is:

Refractive index of the first protective film>>refractive index of the gap portion (air layer)

Accordingly, the beams of light R through T emitted on the surface of the phosphor layer surface enter the protective film, without being reflected on the interface between the first protective film $102a$ and gap portion (air layer) $108$ (without critical angle). The incoming light is discharged to the outside by the optical symmetrical structure of the air layer (layer of low refractive index)/protective film/air lay, without being again reflected on the surface of the protective film—air layer interface, with the result that reduction in the level of sharpness of the image can be prevented.

The following describes the case of FIG. 3($b$):

In the case shown in this drawing, the protective film and phosphor layer are kept coherent. Thus, of the beams of light X through Z emitted on the surface of the phosphor, the beam of light Z having an angle exceeding the critical angle θ is subjected to an increase in the percentage of being fully reflected on the interface, due to the optical asymmetric structure of protective layer—air layer. This is one of the reasons for deterioration in the level of sharpness of the image.

In the present invention, when the scintillator sheet is sealed by the first protective film and second protective film, the first protective film is not substantially coherent with the phosphor layer, as shown in FIG. 3($a$). This arrangement makes it possible to produce a scintillator panel exhibiting no deterioration in sharpness of the image.

In the present invention, as shown in FIG. 1 through FIG. 3, when the scintillator sheet is sealed by the first protective film and second protective film, the first protective film covering the phosphor layer is kept substantially not coherent with the phosphor layer (namely, a point contact positions are provided between the phosphor layer and first protective film, and a gap portions (air layers) are formed among the point contact positions). This arrangement provides the following advantages:

1) In the conventional art, the polypropylene film, polyethylene terephthalate film and polyethylene naphthalate film have not been easily used because the sharpness of the image is reduced due to a greater refractive index, although they have excellent physical properties with respect to strength as protective films. The present invention provides a scintillator panel that permits easy use of these films, whereby production of a scintillator panel exhibiting high quality and preventing deterioration of properties for a long time has become possible.

2) A highly damage-resistant protective film can be utilized without the image quality being deteriorated. This has made it possible to produce a scintillator panel characterized by long-term excellent durability.

3) A protective layer of superb durability can be produced without the phosphor crystal light guiding effect being ruined.

Figure 4:
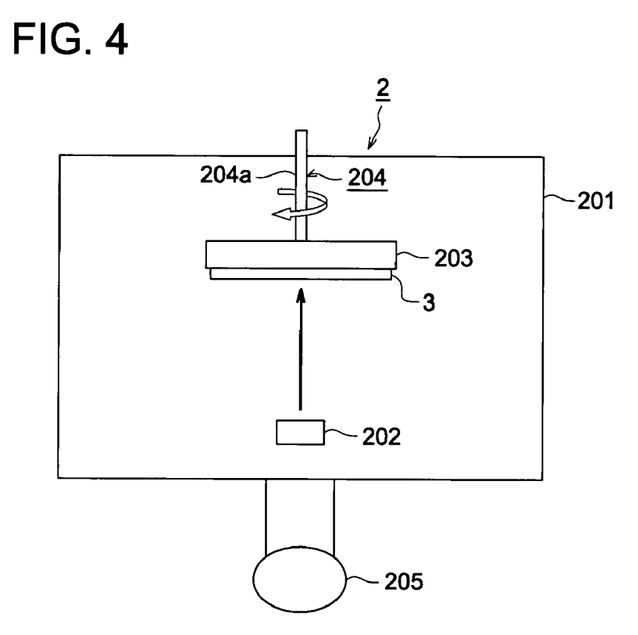
FIG. 4 is a schematic diagram illustrating the vapor deposition apparatus for forming a phosphor layer on a substrate according to the vapor deposition method.

FIG. 4 is a schematic diagram representing the vapor deposition apparatus for forming a phosphor layer on the substrate according to the vapor deposition method.

In the drawing, 2 denotes a vapor deposition apparatus. The vapor deposition apparatus 2 includes a vacuum container 201; an evaporation source 202 arranged in the vacuum container 201 to cause vapor to be deposited to the substrate 3; a substrate holder 203 for holding the substrate 3; a substrate rotating mechanism 204 for depositing the vapor from the evaporation source 202 by rotating the substrate holder 203 relative to the evaporation source 202; and a vacuum pump 205 for degassing the vacuum container 201 and introducing air therein.

To accommodate a phosphor layer forming material and heat it according to the resistance heating method, the evaporation source 202 can be made of an alumina-made crucible wound with a heater, or a heater made up of a boat or metal of high melting point. Further, the phosphor layer forming material can be heated by electron beam or high frequency induction in addition to the resistance heating method. In the present invention, the resistance heating method is preferably used because of comparatively simple structure, easy handling, reduced costs and applicability to extremely diversified types of substances. The evaporation source 202 can be a molecular beam source according to the molecular beam epitaxial method.

The support member rotating mechanism 204 includes, for example, a rotary shaft 204a for supporting the substrate holder 203 and rotating the substrate holder 204, and a motor (not illustrated) arranged out of the vacuum container 201 to be used as a drive source of the rotary shaft 204a. Further, the substrate holder 203 is preferably provided with a heating heater (not illustrated) for heating the substrate 3. The substance adsorbed on the surface of the substrate 3 is removed and separated by heating the substrate 3, thereby avoiding an impure layer between the surface of the substrate 3 and the phosphor layer forming material, enhancing the coherence, and adjusting the film quality of the phosphor layer.

Further, a shutter (not illustrated) for shutting off the space from the evaporation source 202 to the substrate 3 may be provided between the substrate 3 and evaporation source 202.

It is possible to use the shutter to ensure that the substance other than the target object attached on the surface of the phosphor layer forming material will not be evaporated in the initial phase of vapor deposition or deposited on the substrate 3.

To form a phosphor layer on the substrate 3 using the vapor deposition apparatus 2 structured in this manner, a support member 3 is mounted on the substrate holder 203 in the first plate. Then the vacuum container 201 is vacuum-exhausted. After that, the substrate holder 203 is rotated with respect to the evaporation source 202 by the support member rotating mechanism 204. When the vacuum container 201 has reached the degree of vacuum that permits vapor deposition, the phosphor layer forming material is evaporated from the heated evaporation source 202 so as to grow the phosphor on the surface of the substrate 3 to a desired thickness. In this case, the space between the substrate 3 and evaporation source 202 is preferably set at 100 mm through 1500 mm. The phosphor layer forming material used as an evaporation source may be processed in the form of a tablet or powder by pressurization and compression. Instead of the phosphor layer forming material, its raw material or the mixture thereof may be used.

Various types of polymer materials, metal plate, carbon fiber reinforced resin sheet and flexible sheet can be used as the substrate. The material that can be processed into a web is suitable as a flexible sheet. In this respect, such a plastic film as a cellulose acetate film, polyester film, polyethylene terephthalate film, polyethylene naphthalate film, polyamide film, polyimide film, triacetate film or polycarbonate film is preferably used. The surface of the substrate may be smooth, or matted to improve the bondability with the phosphor layer. Further, for these substrates, a subbing layer may be provided on the surface provided with the phosphor layer for the purpose of improving the bondability with the phosphor layer.

The thickness of these substrates differs according to the material of the flexible support member to be used. For example, in the case of the carbon fiber reinforced resin sheet, the thickness is preferably, 300 through 1000 μm, more preferably 500 through 800 μm. In the case of the flexible resin film, the thickness is preferably 50 through 250 μm, more preferably 75 through 150 μm from the viewpoint of easy handling. The substrate thickness shown is the value gained by measurement with a probe type film thickness gauge (PG-01) manufactured by Techlock Inc.

Cesium iodide (CsI) is utilized as a material for forming a phosphor layer because the change rate from X-rays to the visible light is comparatively high and the phosphor can be easily formed into a columnar crystal structure by vapor deposition, with the result that the scattering of the emitted light in the crystal is reduced by the light guiding effect and the thickness of the phosphor layer can be increased. However, only the CsI is used, the light emitting efficiency is low. To make up for this defect, various types of activators are added thereto. For example, it is blended with CsI and sodium iodide (NaI) at a desired mole ratio, as disclosed in the Examined Japanese Patent Publication No. 54-35060.

In recent years, a method of manufacturing the X-rays phosphor is introduced, for example, in the JP-A No. 2001-59899, wherein CsI is subjected to vapor deposition, and an activating agent such as indium (In), thallium (Tl), lithium (Li), calcium (K), rubidium (Rb) and sodium (Na) are formed by spattering.

The following describes the material of the protective film used in the present invention.

The basis layer structure of the protective film used in the present invention is a multilayer material having a structure of the protective layer (outermost layer)/intermediate layer (moisture proof layer)/innermost layer (hot melt layer). Further, each layer can be formed into a multilayer.

The LDPE and LLDPE manufactured using the EVA, PP, LDPE, LLDPE and metallocene catalyst, or a film made of a mixture of these films and HDPE film are preferably used as the thermoplastic resin film of the innermost layer (innermost layer (hot melt layer)).

Intermediate Layer (Moisture Proof Layer)

An intermediate layer (moisture proof layer) is exemplified by a layer containing at least one inorganic film layer, as disclosed in the JP-A No. 6-95302 and Vacuum Handbook, Revised Version PP. 132-134 (ULVAC by Japan Vacuum Technology Inc.). The inorganic film is exemplified by a metallic evaporated film and evaporated film of the inorganic oxide.

The metallic evaporated film is exemplified by ZrN, SiC, TiC, $Si_3N_4$, single crystal Si, ZrN, PSG, amorphous Si, W and aluminum. The particularly preferred metallic evaporated film is an aluminum film.

The inorganic evaporated film is exemplified by the films disclosed in the Thin Film Handbook PP. 879-901 (the Japan Society for the Promotion of Science), Vacuum Technology Handbook PP. 502-509, 612 and 810 (Nikkan Kogyo Shimbun Ltd.), and Vacuum Handbook, Revised and Enlarged Edition, PP. 132 through 134 (ULVAC Japan Vacuum Technology Inc.). These inorganic evaporated films are exemplified by $Cr_2O_3$, $Si_xO_y$ (x=1, y=1.5 through 2.0), $Ta_2O_3$, ZrN, SiC, TiC, PSG, $Si_3N_4$, single crystal Si, amorphous Si, W and $Al_2O_3$.

The thermoplastic resin film used as the substance of the intermediate layer (moisture proof layer) is made of the film material used in the general packaging film such as ethylene tetrafluoroethyl copolymer (ETFE), high-density polyethylene (HDPE), oriented polypropylene (OPP), polystyrene (PS), polymethyl methacrylate (PMMA), biaxial oriented nylon 6, polyethylene terephthalate (PET), polycarbonate (PC), polyimide and polyether styrene (PES).

The evaporated film can be manufactured by a general method disclosed in the "Vacuum Technology Handbook and Packaging Technology" Vol. 29-No. 8 as exemplified by the resistance- or high-frequency induction method, Electro Beam (EB) method and plasma (PCVD). The thickness of the evaporated film is preferably 40 through 200 nm, more preferably 50 through 180 nm.

Protective Layer (Outermost Layer)

The thermoplastic resin film used through the vapor-deposited film sheet is exemplified by:

low-density polyethylene (LDPE) as a polymer film (polymer film described in the Research Center of Toray Industries, Inc. as a new development firm of functional packaging materials) which is employed as the general packaging material, high-density polyethylene (HDPE), linear low-density polyethylene (LLDPE), mid-density polyethylene, un-oriented polypropylene (CPP), OPP, oriented nylon (ONy), PET, cellophane, polyvinyl alcohol (PVA), oriented vinylon (OV), ethylene-vinyl acetate copolymer (EVOH), vinylydene chloride (PVDC), olefin (fluoro-olefin) polymer containing fluorine or olefin copolymer containing fluorine.

A multilayer film manufactured by co-extrusion with various types of films as required and a multilayer film formed by laminating and changing the orientation angle can be used as these thermoplastic resin films, as a matter of course. To get the required physical properties of the packaging material, it is possible to produce the film by a proper combination of the density and molecule distribution of the film to be used. The LDPE and LLDPE prepared by using LDPE, LLDPE and metallocene catalyst can be used to produce the thermoplastic resin film of the innermost layer. A film made of a mixture of these films and HDPE film can also be used as the thermoplastic resin film.

When the inorganic vapor-deposited layer is not used, the protective layer must be provided with the function of the intermediate layer. In this case, a single film or a plurality of films can be selected from among the thermoplastic resin films used for the protective layer, as required. It is exemplified by the CPP/OPP, PET/OPP/LDPE, Ny/OPP/LDPE, CPP/OPP/EVOH, and Saran UB/LLDPE (wherein Saran UB indicates the biaxial oriented film made of the vinylydene chloride/acrylic acid ester based copolymer resin manufactured by Asahi Chemical Industry Co., Ltd.), as well as K—OP/PP, K—PET/LLDPE and K-Ny/EVA (K denotes a film coated with vinylydene chloride resin).

These protective films can be manufactured according to various types of widely known methods as exemplified by a wet lamination method, dry lamination method, hot melt lamination method, extrusion lamination method and hot lamination method. When the film formed by vapor deposition of the inorganic substance is not used, the same methods can be used, as a matter of course. In addition to these methods, multilayer inflation method and coextrusion molding method can also be used, depending on the type of the material to be used.

A commonly known adhesive can be used as the adhesive used at the time of lamination. It is exemplified by:

the hot melt adhesive of polyolefin based thermoplastic resin such as various types of polyethylene resin, various types of polypropylene resin;

the hot melt adhesive of thermoplastic resin such as ethylene copolymer resin including ethylene-propylene copolymer resin, ethylene-vinyl acetate copolymer resin and ethylene-ethyl acrylate copolymer resin; ethylene-acrylic acid copolymer resin, and ionomer resin; and other hot melt type rubber based adhesives.

The emulsion type adhesive as an emulsion and latex based adhesive is typically represented by the emulsions of polyvinyl acetate resin, vinyl acetate ethylene copolymer resin, copolymer resin of vinyl acetate and acrylic acid ester, copolymer resin of vinyl acetate and maleic acid ester, acrylic acid copolymer and ethylene-acrylic acid copolymer.

The latex type adhesive is typically represented by rubber latexes such as natural rubber, styrene butadiene rubber (SBR), acryl nitrile butadiene rubber and chloroprene rubber (CR). The adhesive for dry lamination is exemplified by isocyanate based adhesive, urethane based adhesive, and polyester based adhesive. It is further exemplified by the known adhesives such as a hot melt lamination adhesive prepared by blending a paraffin wax, micro crystalline wax, ethylene-vinyl acetate copolymer resin and ethylene-ethyl acrylate copolymer resin; a pressure sensitive adhesive and a heat-sensitive adhesive. To put it more specifically, in addition to the polymer made up of the polyolefin resin such as various types of polyethylene resin, polypropylene resin and polybutylene resin, and ethylene copolymer (EVA, EEA, etc.) resin, the polyolefin based resin adhesive for extrusion lamination includes a copolymer of ethylene and other monomers ($\alpha$-olefin) such as L-LDPE resin, and ionomer resin (ion copolymer resin) such as Surlin by Dupot and Himiran by Mitsui Polychemical Inc., and Admer (adhesive polymer by Mitsui Petrochemical Industries, Ltd.). Further, a UV curable adhesive has come into use in recent years. Particularly the LDPE resin and L-LDPE resin are less costly and is suited for lamination. Therefore, it is preferably used. The blended resin prepared by blending two or more of the aforementioned resins to cover the defects of each resin is particularly preferred. For example, when the L-LDPE resin and LDPE resin are blended, spreadability is improved, and the neck-in size is reduced. This improves the lamination speed and reduces the number of pin holes.

EXAMPLES

The following describes the details of the present invention with reference to Examples, however, the present invention is not limited thereto.

Example 1

(Manufacture of Scintillator Sheet)
(Preparation of Substrate)

An aluminum plate (90 mm×90 mm) having a thickness of 0.5 mm was prepared as a substrate.

(Forming of Phosphor Layer)

Using the vapor deposition apparatus shown in FIG. 4, a phosphor (CsI:0.003Tl) was vapor-deposited on a prepared aluminum plate to form a phosphor layer, whereby a scintillator sheet was manufactured. The resistance heating crucible was filled with the phosphor material (CsI:0.003Tl), and an aluminum plate was placed on the support holder. The distance between the resistance heating crucible and aluminum plate was adjusted to 400 mm. This was followed by the step of evacuating the vapor deposition apparatus and introducing an argon gas therein. After the degree of vacuum was adjusted to 0.5 Pa, the temperature of the aluminum plate was kept at 150° C. while the aluminum plate was rotated at a speed of 10 rpm. Then the resistance heating crucible was heated and phosphor was vapor-deposited. When the film thickness of the phosphor layer reached 160 μm, vapor deposition was terminated. The surface roughness of the phosphor layer was 0.5 pm Ra. The surface roughness is the value obtained by measuring with Surfcom 1400D manufactured by Tokyo Seimitsu Co., Ltd.

(Preparation of a Protective Film)

Protective films 1-1 to 1-5 were prepared using PET (12 μm)/CPP (30 μm) laminates of which surface roughnesses of the innermost layers (hot melt layers) were changed as shown in Table 1, the films being laminated according to dry lamination method using a two-liquid reactive urethane adhesive, wherein the thickness of adhesive was 1 μm. The surface roughness was adjusted by properly selecting the CPP of the innermost layer (CPP: hot melt layer) from among the commercially available CPPs. The haze ratios of these protective films were 5% -6%, and the moisture permeabilities were 12-13 g/m$^2$/day (40° C.-90% RH), showing almost the same values. To manufacture a protective film for comparison, an adhesive (Byron 300 manufactured by Toyobo Co., Ltd.) was coated on the innermost layer of the No. 1-1 protective film (on the side of the hot melt layer) which was dried to form an adhesive layer (1 μm), whereby a film having an adhesive property was manufacture, which was designated as Protective film No. 1-6.

The surface roughness was measured by the Surfcom 1400D manufactured by Tokyo Seimitsu Co., Ltd. The thickness is the value obtained by finding the average of the measurements taken by a probe type film thickness gauge (PG-01) manufactured by Techlock Inc. The haze ratio is the value obtained by measuring with the NDH 5000W manufactured by Nippon Denshoku Co., Ltd. The moisture permeability is the value obtained by measuring according to JIS Z0208.

TABLE 1

| Protective film No. | Surface roughness Ra (μm) |
|---|---|
| 1-1 | 0.03 |
| 1-2 | 0.05 |
| 1-3 | 0.28 |
| 1-4 | 0.80 |
| 1-5 | 0.98 |
| 1-6 | — |

(Manufacture of Scintillator Panel)

The prepared scintillator sheets were sealed as shown in FIG. 1(c) using the protective films No. 1-1 through 1-6 having been prepared, whereby scintillator panels were manufactured as Sample Nos. 101 through 106. To get the number of point contact portions between the surface of the phosphor layer and protective film, X-rays were applied to the scintillator panel, the data was read by the flat light receiving element using the CCD, and the reading was subjected to the Fourier transformation, whereby the number of point contact portions were calculated from the position of the peak of the power spectrum having been obtained.

The Sample Nos. 101 through 106 were sealed by fusing under a reduced pressure of 1000 Pa in such a way that the distance from the fused section to the edge portion of the scintillator sheet was 1 mm. The heater of the impulse sealer used for fusion was 8 mm.

Evaluation

Each of the Sample Nos. 101 through 106 having been prepared was set on a CMOS flat panel (X-ray CMOS camera system Shad-o-Box 4KEV by Rad Icon Inc.) having dimensions of 10 cm×10 cm and the sharpness of the image and luminance was measured according to the following method based on the 12-bit output data. Table 2 shows the result of evaluation according to the evaluation rank shown below.

Sharpness Evaluation Method

X-rays with a tube voltage of 80 kVp were applied to the back side (the surface without the phosphor layer formed thereon) of each sample through the MTF chart made of lead. The image data was detected by the CMOS flat panel in close contact with the scintillator sheet and was recorded on the hard disk. After that, the record on the hard disk was analyzed by the computer, and the modulation transfer function MTF of the X-ray image (MTF value (%) at a spatial frequency of 1 cycle/mm) recorded on this hard disk was used as an index of sharpness of the image. In Table 2, a higher MTF value means that the sharpness of the image is higher. The MTF is an abbreviation for Modulation Transfer Function.

Sharpness Evaluation Rank

A: MTF value (%) at a spatial frequency of 1 cycle/mm is 0.9 or more

B: MTF value (%) at a spatial frequency of 1 cycle/mm is 0.7 or more but less than 0.9

C: MTF value (%) at a spatial frequency of 1 cycle/mm is 0.6 or more but less than 0.7

D: MTF value (%) at a spatial frequency of 1 cycle/mm is less than 0.6

Luminance Evaluation Method

X-rays with a voltage of 80 kVp were applied to the back side (the surface without the phosphor layer formed thereon) of each sample. The image data was detected by the CMOS flat panel in close contact with the scintillator, and the average signal value of the image having been obtained was divided by the average signal value of the comparative Sample No. 106 immediately after sealing. The resulting value was used as luminance.

Luminance evaluation rank
A: 1.10 or more
B: 1.05 or more but less than 1.10
C: 0.95 or more but less than 1.05
D: Less than 0.95

TABLE 2

| Sample No. | Protective film No. | Number of point contact portions (Point/mm$^2$) | MTF immediately after sealing | Luminance immediately after sealing | Remarks |
|---|---|---|---|---|---|
| 101 | 1-1 | 0.1 | A | A | Present invention |
| 102 | 1-2 | 1.2 | A | A | Present invention |
| 103 | 1-3 | 5 | A | A | Present invention |
| 104 | 1-4 | 10 | A | A | Present invention |
| 105 | 1-5 | 25 | A | A | Present invention |
| 106 | 1-6 | 100 or more | D | C | Comparative sample |

The efficacy of the present invention has been verified.

Example 2

(Manufacture of Scintillator Sheet)
(Preparation of Substrate)
A polyimide film (90 mm×90 mm) having a thickness of 0.5 mm was prepared as a substrate.

(Formation of Phosphor Layer)
A phosphor (CsI:0.003Tl) was vapor-deposited on the prepared polyimide film using the vapor deposition apparatus shown in FIG. 4. As shown in Table 3, phosphor layers having different surface roughnesses were formed to produce scintillator sheets, which were designated as Scintillator sheet Nos. 2-1 through 2-5. Surface roughness was changed by adjusting the temperature of the polyimide film immediately after termination of vapor deposition. A resistance heating crucible was filled with the phosphor material (CsI:0.003Tl), and a polyimido plate was mounted on the support holder. The space between the resistance heating crucible and polyimide film was adjusted to 400 mm. Then the vapor deposition apparatus was evacuated and was filled with argon gas until the degree of vacuum reached 0.5 Pa. The temperature of the polyimide film was kept at 150° C. while the polyimide film was rotated at a speed of 10 rpm. Then the resistance heating crucible was heated and phosphor was vapor-deposited. When the film thickness of the phosphor layer reached 480 μm, the substrate temperature was suddenly changed. After that, vapor deposition was terminated when the thickness had reached 500 μm. The surface roughness used is the value measured by the same procedure as that of the Example 1.

(Preparation of Protective Film)
PET (12 μm)/Al$_2$O$_3$ (0.01 μm)/PET (12 μm)/CPP (30 μm) was prepared according to the dry lamination method using the two-liquid reactive urethane based adhesive, wherein the adhesive was 1 μm thick. The innermost layer (hot melt layer) had a surface roughness Ra of 0.28 μm, a haze ratio of 6%, and a moisture permeability of 1.0 g/m$^2$/day (40° C.-90% RH). The surface roughness, haze ratio and moisture permeability of the innermost layer (hot melt layer) were the values measured by the same procedure as that of Example 1.

(Manufacture of Scintillator Panel)
The scintillator sheets No. 2-1 through 2-5 having been prepared were sealed with the prepared protective film, as shown in FIG. 1(c). Then scintillator panels were produced in the same procedure and conditions as those of Example 1. These panels are designated as Sample Nos. 201 to 205. The number of point contact portions between the surface of the phosphor layer and protective film is the value measured by the same procedure as that of Example 1.

Evaluation
The number of point contact portions, sharpness of the image and luminance for each of the Sample Nos. 201 to 205 having been produced were measured under the same conditions as those of Example 1. The result of measurement was evaluated according to the same evaluation rank as that of Example 1. The evaluation is shown in Table 3.

TABLE 3

| Sample No. | Scintillator sheet No. | Surface roughness of phosphor layer Ra (μm) | Number of point contact portions (Point/mm$^2$) | MTF immediately after sealing | Luminance immediately after sealing |
|---|---|---|---|---|---|
| 201 | 2-1 | 0.08 | 0.05 | B | A |
| 202 | 2-2 | 0.1 | 0.1 | A | A |
| 203 | 2-3 | 0.8 | 5 | A | A |
| 204 | 2-4 | 5.0 | 25 | A | A |
| 205 | 2-5 | 8.0 | 100 or more | B | B |

The efficacy of the present invention was verified.

Example 3

(Manufacture of Scintillator Sheet)
The same scintillator sheets as that produced in Example 1 was manufactured.

(Preparation of Protective Film)
The same protective film as that produced as Protective film No. 1-3 in Example 1 was manufactured.

(Manufacture of Scintillator Panel)
The prepared scintillator sheets were sealed with the prepared protective films in the same procedure and conditions as those of Example 1, and in the form of FIG. 1(c), except that the degree of reduced pressure was changed to the level of Table 4, whereby scintillator panels were produced, which were designated as Sample Nos. 301 to 305. The number of point contact portions between the surface of the phosphor layer and protective film is the value measured by the same procedure as that of Example 1.

Evaluation
The sharpness of the image and luminance for each of the Sample Nos. 301 through 305 having been produced were measured under the same conditions as those of Example 1. The result of measurement was evaluated according to the same evaluation rank as that of Example 1. The evaluation is shown in Table 4.

TABLE 4

| Sample No. | Degree of reduced pressure (Pa) | Number of point contact portions (Point/mm²) | MTF immediately after sealing | Luminance immediately after sealing |
|---|---|---|---|---|
| 301 | 2 | 50 | B | B |
| 302 | 5 | 25 | A | A |
| 303 | 1000 | 5 | A | A |
| 304 | 8000 | 0.1 | A | A |
| 305 | 12000 | 0.05 | B | A |

The efficacy of the present invention was verified.

Example 4

(Manufacture of Scintillator Sheet)

The same scintillator sheet as that produced in Example 1 was manufactured.

(Preparation of Protective Film)

The same protective film as Protective film No. 1-3 of that produced in Example 1 was manufactured.

(Manufacture of Scintillator Panel)

The prepared scintillator sheets were sealed with the prepared protective film as shown in FIG. 1(c), in the same procedure and conditions as those of Example 1, except that transparent particles having different diameters as shown in Table 5 were arranged on the surface of the phosphor layer so that the number of the point contact sections would be 5 per mm², whereby scintillator panels were produced as Sample Nos. 401 through 405. PMMA particles were used as the transparent particles. The number of point contact portions between the surface of the phosphor layer and protective film is the value measured by the same procedure as that of Example 1.

Evaluation

The number of point contact portions, sharpness of the image and luminance for each of the Sample Nos. 401 through 405 having been produced were measured under the same conditions as those of Example 1. The result of measurement was evaluated according to the same evaluation rank as that of Example 1. The evaluation is shown in Table 4.

TABLE 5

| Sample No. | Transparent particle diameter (μm) | MTF immediately after sealing | Luminance immediately after sealing |
|---|---|---|---|
| 401 | — | B | B |
| 402 | 0.5 | A | A |
| 403 | 1.0 | A | A |
| 404 | 10 | A | A |
| 405 | 20 | B | B |

The efficacy of the present invention was verified.

Example 5

(Manufacture of Scintillator Sheet)

The same phosphor layer as that of Example 1 was produced using the same substrate as that of Example 1 under the same condition as those of Example 1, whereby a scintillator sheet was manufactured.

(Preparation of Protective Film)

The protective films having a thickness, haze ratio and moisture permeability changed as shown in Table 6 were prepared as a protective film, and they were used as Protective film Nos. 5-1 to 5-12. By properly selecting the ones available on the market, the PET of the 5-1, 5-2, and the CPP of the innermost layer of 5-3 through 5-12 were adjusted so that the surface roughness Ra was 0.25 to 0.31 μm. The surface roughness, haze ratio and moisture permeability of the protective film are the values measured in the same procedure as that of Example 1.

TABLE 6

| Protective film No. | Layer composition | Thickness (μm) | Haze ratio (%) | Moisture permeability (g/m²/day (40° C.-90% RH)) |
|---|---|---|---|---|
| 5-1 | PET (8) | 8 | 2 | 80 |
| 5-2 | PET (12) | 12 | 5 | 50 |
| 5-3 | CPP (20) | 20 | 5 | 18 |
| 5-4 | CPP (20) | 20 | 45 | 25 |
| 5-5 | PET (12)/CPP (30) | 43 | 8 | 13 |
| 5-6 | PET (25)/CPP (30) | 56 | 10 | 10 |
| 5-7 | PET (50)/CPP (30) | 81 | 15 | 6.1 |
| 5-8 | PET (50)/CPP (30) | 81 | 48 | 10 |
| 5-9 | PET (75)/CPP (30) | 106 | 12 | 4.8 |
| 5-10 | PET (12)/$Al_2O_3$ (0.01)/CPP (30) | 44 | 8 | 1 |
| 5-11 | PET (12)/$Al_2O_3$ (0.01)/PET (12)/$Al_2O_3$ (0.01)/CPP (30) | 56 | 12 | 0.1 |
| 5-12 | PET (12)/$Al_2O_3$ (0.01)/PET (12)/$Al_2O_3$ (0.01)/PET (12)/$Al_2O_3$ (0.01)/CPP (30) | 70 | 13 | 0.05 |

The values of the Protective film Nos. 5-1 to 5-12 in parenthesis show the thickness (μm) of each layer. The laminated films shown in the Protective film Nos. 5-5 to 5-9 were manufactured according to the dry lamination method using the two-liquid reactive urethane based adhesive of a thickness of 1 μm. The haze ratio was adjusted by changing the product type of the PET and CPP. The Protective film Nos. 5-10 to 5-12 were manufactured using the PET film vapor-deposited with $Al_2O_3$, wherein the two-liquid reactive urethane based adhesive of a thickness of 1 μm was used for the laminated layer.

(Manufacture of Scintillator Panel)

The prepared scintillator sheets were sealed with the prepared Protective film Nos. 5-1 to 5-12 to get the form of FIG. 1(c), whereby scintillator panels were manufactured as Sample Nos. 501 to 512. The Sample Nos. 501 to 512 were sealed under the same conditions as those of Example 1. The number of the point contact portions between the phosphor layer of each of the Sample Nos. 501 to 512 and the protective film was 5 per $mm^2$. The number of the point contact portions was measured in the same procedure as that of Example 1.

Evaluation

The sharpness of the image and luminance of each of the Sample Nos. 501 to 512 were measured under the same conditions as those of Example 1, immediately after sealing and after having been left to stand at 40° C. with a relative humidity of 90 percent for 30 days. The result was evaluated according to the same evaluation rank as that of Example 1. Table 7 shows the result of evaluation. The luminance is the value obtained by dividing by the average signal value of the Comparative Example No. 106 in Example 1.

TABLE 7

| Sample No. | Protective film No. | MTF *1 | MTF *2 | Luminance *1 | Luminance *2 |
|---|---|---|---|---|---|
| 501 | 5-1 | B | C | A | C |
| 502 | 5-2 | A | A | A | A |
| 503 | 5-3 | A | A | A | A |
| 504 | 5-4 | B | B | A | A |
| 505 | 5-5 | A | A | A | A |
| 506 | 5-6 | A | A | A | A |
| 507 | 5-7 | B | B | A | A |
| 508 | 5-8 | B | B | A | A |
| 509 | 5-9 | B | B | A | A |
| 510 | 5-10 | A | A | A | A |
| 511 | 5-11 | A | A | A | A |
| 512 | 5-12 | B | B | A | A |

*1: Immediately after sealing,
*2: After having been left to stand

The efficacy of the present invention was verified.

What is claimed is:

1. A radiographic image detecting apparatus comprising a scintillator panel and a flat panel detector, wherein the scintillator panel comprising:

(a) a scintillator sheet comprising:

(i) a substrate, and (ii) a phosphor layer comprising cesium iodide (CsI) formed on the substrate;

(b) a first protective film provided on a phosphor layer side surface of the scintillator sheet; and (c) a second protective film provided on a substrate side surface of the scintillator sheet, wherein (d) the scintillator sheet is sealed by the first protective film and the second protective film; and (e) the first protective film contacts the phosphor layer at a number of point contacts, wherein the density of point contacts ranges from 0.1 - 25 point contacts per $mm^2$.

2. The scintillator panel of claim 1, wherein a surface roughness Ra of a surface of the phosphor layer is 0.1 μm to 5.0 μm.

3. The scintillator panel of claim 1, wherein a surface roughness Ra of a surface of the first protective film facing the phosphor layer is 0.1 μm to 5.0 μm.

4. The scintillator panel of claim 1, wherein transparent particles having diameters of 0.5 μm to 10 μm are provided on the phosphor layer before sealing the scintillator sheet by the first protective film and the second protective film.

5. The scintillator panel of claim 1, wherein the scintillator sheet is sealed under a pressure of 5 Pa to 8000 Pa.

6. The scintillator panel of claim 1, wherein each of the first protective film and the second protective film has a thickness of 12 μm to 60 μm and a haze ratio of 3 % to 40 %.

7. The scintillator panel of claim 1, wherein each of the first protective film and the second protective film has a moisture permeability of 0.01 $g/m^2$/day to 50 $g/m^2$/day under a condition of 40 ° C. and 90 %RH.

8. The scintillator panel of claim 1, wherein the phosphor layer is formed by a vapor deposition method on the substrate.

* * * * *